US009495074B2

(12) United States Patent
Nogami et al.

(10) Patent No.: US 9,495,074 B2
(45) Date of Patent: Nov. 15, 2016

(54) INFORMATION PROCESSING SYSTEM, STORING MEDIUM, INFORMATION PROCESSING DEVICE, AND DISPLAY METHOD

(71) Applicant: NINTENDO CO., LTD., Kyoto (JP)

(72) Inventors: Hisashi Nogami, Kyoto (JP); Kiyoshi Mizuki, Kyoto (JP); Ryota Oiwa, Kyoto (JP); Ichiro Suzuki, Kyoto (JP); Wataru Tanaka, Kyoto (JP)

(73) Assignee: NINTENDO CO., LTD., Kyoto (JP)

( * ) Notice: Subject to any disclaimer, the term of this patent is extended or adjusted under 35 U.S.C. 154(b) by 81 days.

(21) Appl. No.: 13/837,553

(22) Filed: Mar. 15, 2013

(65) Prior Publication Data

US 2013/0326410 A1 Dec. 5, 2013

(30) Foreign Application Priority Data

Jun. 1, 2012 (JP) ................. 2012-126579

(51) Int. Cl.
*G06F 3/048* (2013.01)
*G06F 3/0482* (2013.01)
*G06F 17/30* (2006.01)

(52) U.S. Cl.
CPC ....... *G06F 3/0482* (2013.01); *G06F 17/30905* (2013.01)

(58) Field of Classification Search
CPC .................................................. G06F 3/0482
See application file for complete search history.

(56) References Cited

U.S. PATENT DOCUMENTS

| 6,757,691 | B1* | 6/2004 | Welsh et al. | |
| 7,173,177 | B1* | 2/2007 | Gould et al. | 84/615 |
| 8,782,521 | B2 | 7/2014 | Bell | |
| 2004/0140975 | A1 | 7/2004 | Saito et al. | |
| 2007/0083556 | A1 | 4/2007 | Plastina | |
| 2008/0209474 | A1 | 8/2008 | Pjanovic | |
| 2008/0222106 | A1* | 9/2008 | Rao et al. | 707/3 |
| 2009/0075739 | A1 | 3/2009 | Richardson | |
| 2009/0276334 | A1 | 11/2009 | Hosoda et al. | |
| 2010/0306708 | A1 | 12/2010 | Trenz | |
| 2011/0032250 | A1 | 2/2011 | Tanaka | |
| 2011/0302032 | A1 | 12/2011 | Ishii et al. | |

(Continued)

FOREIGN PATENT DOCUMENTS

| JP | 2004-139440 | 5/2004 |
| JP | 2011-166621 | 8/2011 |

(Continued)

OTHER PUBLICATIONS

Jun. 5, 2013 Search Report for EP 13159347.7, 4 pages.

(Continued)

*Primary Examiner* — Peiyong Weng
(74) *Attorney, Agent, or Firm* — Nixon & Vanderhye PC

(57) ABSTRACT

An example information processing device includes: a selection unit that selects a predetermined number of contents including at least one of first contents available at an information processing device and at least one of second contents usable with restriction; a display controller that displays objects each corresponding to a content included in the selected at least one of first contents and the selected at least one of second contents; and an execution unit that executes a processing corresponding to an object included in the displayed objects in response to designation of the object by a user.

15 Claims, 11 Drawing Sheets

(56) References Cited

U.S. PATENT DOCUMENTS

2012/0192048 A1 7/2012 Suzuki et al.
2012/0278127 A1 11/2012 Kirakosyan et al.
2013/0162906 A1 6/2013 Davidson
2013/0326410 A1 12/2013 Nogami et al.

FOREIGN PATENT DOCUMENTS

| JP | 2011-257918 | 12/2011 |
|----|-------------|---------|
| WO | 2011/040371 | 4/2011 |

OTHER PUBLICATIONS

Office Action (6 pages) dated Mar. 18, 2014 issued in corresponding European Application No. 13 159 347.7-1952.
Jun. 4, 2013 Search Report for EP 13159349.3, 4 pages.
Office Action (28 pgs.) dated Nov. 20, 2015 issued in U.S. Appl. No. 13/837,033.
"Starting and closing applications", PlayStation Vita user's guide, 2012 http://manuals.playstation.net/document/jp/psvita/basic/start.html, and English counterpart, 4 pages.
"PlayStation®Store overview", PlayStation Vita user's guide, 2012 http://manuals.playstation.net/document/jp/psvita/store/aboutstore.html, and English counterpart, 6 pages.
Office Action (3 pgs.) dated Mar. 11, 2016 issued in corresponding Japanese Application No. 2012-126557 (3 pgs.)
Nogami, Office Action dated May 24, 2016 issued in U.S. Appl. No. 13/837,033 (27 pages).

* cited by examiner

| USER ID |
|---|
| GENDER |
| DATE OF BIRTH |
| INTERESTS |
| COMMENT |
| AVATAR |
| FAVORITE COMMUNITIES |
| NUMBER OF POSTED MESSAGES |
| NUMBER OF FEEDBACKS |
| FRIENDS |
| MY FAVORITE USERS |
| USERS FAVORING ME |
| PROFICIENCY |
| PLAYING HISTORY |
| PURCHASE HISTORY |

FIG. 8

INFORMATION PROCESSING SYSTEM, STORING MEDIUM, INFORMATION PROCESSING DEVICE, AND DISPLAY METHOD

CROSS-REFERENCE TO RELATED APPLICATIONS

This application is based on and claims priority under 35 U.S.C. 119 from Japanese Patent Application No. 2012-126579, which was filed on Jun. 1, 2012.

FIELD

The technology herein described relates to controlling a screen for selecting contents.

BACKGROUND AND SUMMARY

In game consoles disclosed in the documents described above, a user inputs an instruction to display a home screen when starting a game owned by the user. If the user wishes to start a game that has not yet been tried by the user, an instruction is required to be input by the user to display a screen other than the home screen. The user interfaces (UI) described above does not provide sufficient motivation for a user to try or purchase games or contents new to the user. Thus, users may as a result of interacting with the UI above tend to play a limited number of games repeatedly.

The present disclosure provides an information processing device including: a selection unit that selects a predetermined number of contents including at least one of first contents available at an information processing device and at least one of second contents usable with restriction; a display controller that displays objects each corresponding to a content included in the selected at least one of first contents and the selected at least one of second contents; and an execution unit that executes a processing corresponding to an object included in the displayed objects in response to designation of the object by a user.

BRIEF DESCRIPTION OF THE DRAWINGS

Exemplary embodiments will now be described in detail based on the following figures, wherein:

FIG. 8 shows an example non-limiting data structure of user information;

DETAILED DESCRIPTION OF NON-LIMITING EXAMPLE EMBODIMENT

1. Summary of the Exemplified Embodiment

The embodiment relates to a technology of displaying a first type object and a second type object for a user, the first type object being determined on the basis of content-based activities of the user and the second type object being determined on the basis of activities of another user. In other words, the present embodiment relates to selection of a content(s) in view of activities of the user and those of the another user, so as to provide information to the user by displaying objects corresponding to the selected content(s).

Upon viewing a screen on which the objects described above are displayed, a user is presented with a content other than a content the user is about to use. Thus, in the present embodiment, a screen is provided that is suitable for both a user who wishes to use a known content and a user who wishes to use an unknown content. In addition, even if a user tends to use the same content repeatedly, the user is made aware of unfamiliar content with ease and thus is prompted to try the new content.

According to the present embodiment, it is possible to display the first type object corresponding to a first content and the second type object corresponding to a second object in a single screen. An executed processing in response to designation of an object from a user, can be variable depending on whether the designated object corresponds to the selected at least one of first contents or the selected at least one of second contents. Thus, the user does not have to view two screens for using the first and second contents, respectively.

2. Details of Exemplified Embodiment

Figure 1:
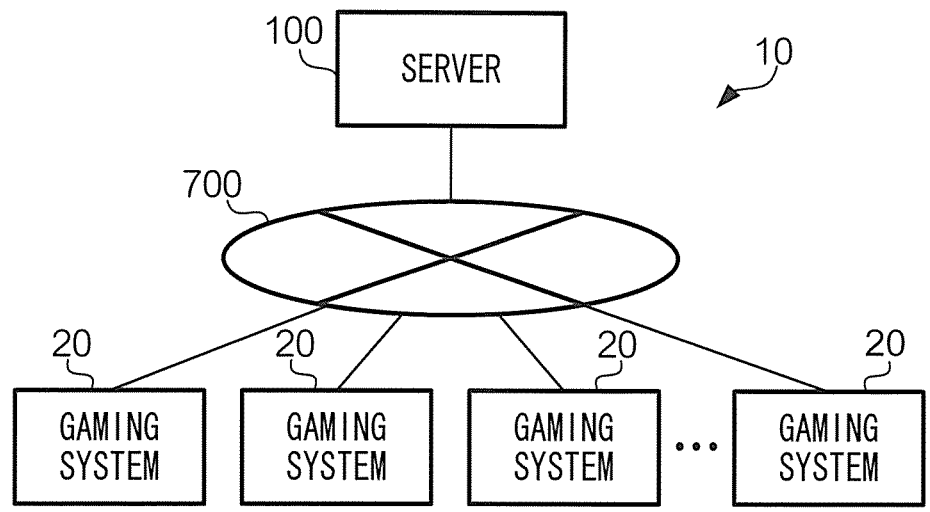
FIG. 1 is a block diagram showing an example non-limiting overall structure of an information processing system.

FIG. 1 is a block diagram showing an overall configuration of information processing system 10 according to an exemplified embodiment. In the present embodiment, a game is executed (application software) as a content and a user is provided with a message sharing service via the content. Information processing system 10 includes a server 100 and a plurality of gaming systems 20, which are interconnected via a network 700. Network 700 may be the Internet, but is not limited thereto.

Figure 2:
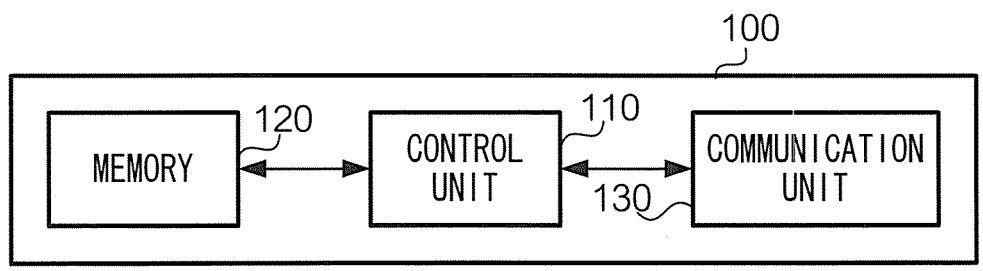
FIG. 2 is a block diagram showing an example non-limiting hardware configuration of a server.

FIG. 2 is a block diagram showing a hardware configuration of server 100. Server 100 includes a control unit 110, memory 120, and communication unit 130. Control unit 110 controls all the units of server 100. Control unit 110 includes a central processing unit (CPU) or other processing elements and a main memory, to control the units by executing a program(s). Memory 120 stores data. Specifically, memory 120 includes a storage device such as a hard drive for storing a variety of data, described later. Communication unit 130 transmits and receives data to and from gaming systems 20 via network 700.

Figure 3:
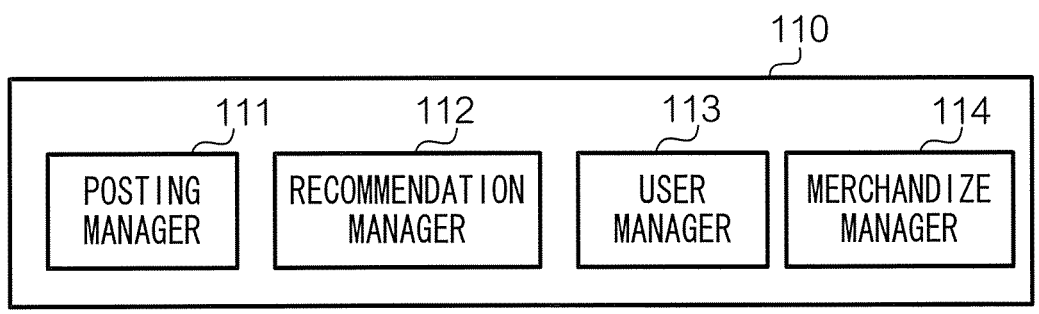
FIG. 3 is a block diagram showing an example non-limiting functional configuration of the server.

FIG. 3 is a block diagram showing a functional configuration of server 100. Control unit 110 includes a posting manager 111, recommendation manager 112, user manager 113 and merchandize manager 114 as functional elements. Functionalities of these elements are implemented by execution of a predetermined program(s) by control unit 110. Alternatively, functionalities of server 100 may be realized by two or more computer devices. In this case, the managers described above are implemented by different computer devices.

Posting manager 111 provides users of gaming systems 20 with a message sharing service. Posting manager 111 enables a user to communicate with other users via a message board, and provides users with recommendations on games to prompt the users to buy or play the games. Specifically, a message input by a user via an input unit (i.e., main controller 300 or sub controller 400) of gaming system 20 is received via network 700 together with a user ID, and the message and the user ID are stored in a message database. Also, in response to a request from gaming system 20, posting manager 111 transmits a message stored in the message database, such that a user is able to read the message on a display device of the gaming system 20.

A user ID of a user who posts a message, a date and time of the posting, content of the message posted including a text, hand-written image, and the like, are stored in the message database. Optionally, a user may add to the message to be posted information indicative of an emotion that the user wishes to express at the time of posting, via an input unit of gaming system 20. For example, the user may input information indicative of an emotion by selecting an item(s) from "normal," "happy," "like," "surprised," "frustrated," "in trouble," and so on, and inputting the item(s). The input information is transmitted together with the respective message and stored in the message database. Also, posting manager 111 manages information on communities. Specifically, posting manager 111 stores, for each community, identification information (game ID) of games relating to the community, identification information (user ID) of users participating in or registered at the community, and other information relating to the community.

Recommendation manager 112 selects a game(s) to be recommended for users. Recommendation manager 112 may select a game(s) for a user based on activities of the user stored in information processing system 10. For example, recommendation manager 112 determines a recommended game(s) based on a number of posted messages, a number of evaluations performed, an average rating of the evaluations, and the like. Alternatively, recommendation manager 112 determines a recommended game based on earnings from commercial sales of the game or a number of downloads. Alternatively, recommendation manager 112 determines a recommended game in accordance with a recommendation made by a service provider or developer of the game. Hereinafter, games selected by recommendation manager 112 are referred to as "popular games." Recommendation manager 112 updates popular games based on a user's activities, by a predetermined timing (for example, by a unit of predetermined hours or predetermined days). Alternatively, recommendation manager 112 may adjust a recommended game(s) for a user based on known preferences of the user. For example, in a case where a user often plays a game of a particular genre/series, recommendation manager 112, gives high priority to games of the particular genre/series when determining a recommended game(s).

User manager 113 includes functionalities of managing information of users and selecting user objects to be displayed on the start screen. Details of the start screen will be described later. The functionality of managing information of users is used to manage information on users who are using the message sharing service or playing games. More specifically, the functionality of managing information of users includes storing and managing activities of users of the service provided by the information processing system 100 in addition to user IDs, user names, profile information, and avatars. For example, user manager 113 manages a login status of a user by authenticating the user when logged-in, and stores playing histories of games played by the logged-in user, messages posted by the user via the message sharing service, and received evaluations from other users. Specifically, user manager 113 stores, for each registered user, at least a user ID, game IDs (playing history) of games that have been played by a user identified by the user ID, game IDs of communities to which the user identified by the user ID has posted a message(s), and the message(s) (posting history). According to one embodiment, the stored message may be information on a link to a message managed by posting manager 111. User manager 113 collects playing histories of users from gaming systems 20, and collects posting histories from posting manager 111 via network 700.

The functionality of selecting user objects of user manager 113, includes selecting a user(s) from among candidate users other than the user (described later), based on a login status, playing history, and/or posting history of the candidate user(s), and a notification of user information on the user(s) selected from among the candidate users to base station 200. For example, user manager 113 may select friends of the user, a predetermined number of users who have played popular games, or a predetermined number of users randomly selected from all the users of the information processing system 10. Alternatively, user manager 113 may select users currently logged-in or users frequently involved in particular activities.

Merchandize manager 114 is configured to retail contents such as games to users of gaming systems 20. Merchandize manager 114 may be configured to handle online payments. In the present embodiment, a user can buy an additional content for use in a game, in addition to the game. The additional content may be an item used in the game, benefits for use in playing the game, or the like. In the present embodiment, both an additional content and game are referred to generically as "a game product." A game product provided by merchandize manager 114 need not be provided at cost, and may be a trial version of a game, or an item provided free of charge. A service provided by merchandize manager 114 that enables a user to buy a content online is referred to as a content online purchasing service. In the online purchasing service, a content is downloaded via network 700 and stored in a non-volatile memory of gaming systems 20. Alternatively, the content is delivered to a user in a form of material via a physical distribution system.

Server 100 stores account information for each user and game information for each game in memory 120. The account information is necessary for authenticating a user and is referred to when a user logs in. The game information includes information related to a game (a game ID, explanation of the game, messages posted to a community pertaining to the game, a URL of a web server that provides the online purchasing service for the game, and the like) and information indicative of a popularity of the game.

Figure 4:
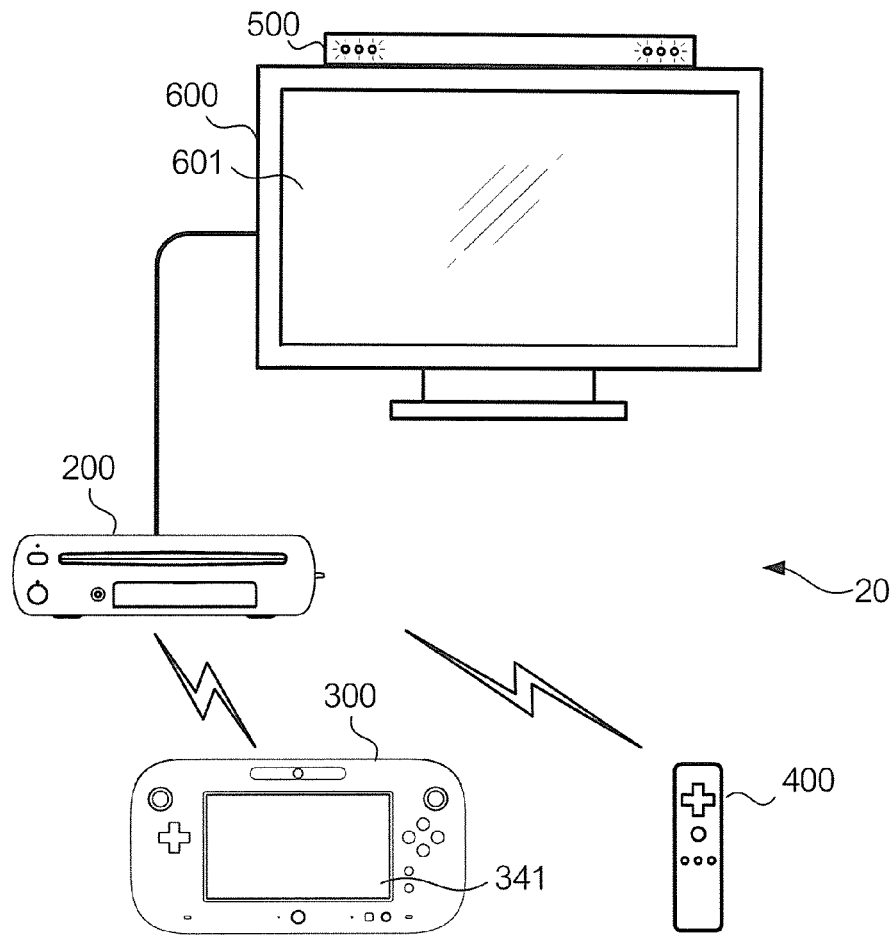
FIG. 4 shows an example non-limiting devices included in the gaming system.

FIG. 4 shows devices included in a single gaming system 20. Typically, gaming system 20 may be situated in a house of a user. Gaming system 20 can either be used by a single user or shared by two or more users such as family members. Gaming system 20 includes a base station 200, main controller 300, sub controller 400, light emitting device 500, and display 600. Two or more main controllers 300 and/or sub controllers 400 may be provided in a case where two or more users use the system simultaneously.

Base station 200 is an information processing device connected to network 700. Base station 200 performs a processing necessary for enabling a user to use the message sharing service and execute a game. Processing performed by base station 200 includes control of main controller 300 and display 600.

Main controller 300 and sub controller 400 are portable input devices for hand-held use. It is noted that main controller 300 functions also as a display since a screen is provided at main controller 300. In this example, main controller 300 and sub controller 400 communicate with base station 200 by radio. Alternatively, main controller 300 and sub controller 400 communicate with base station 200 by wire.

Light-emitting device 500 emits a light detectable by sub controller 400. Preferably, the light emitted by light-emitting device 500 is infrared or light of another frequency that normally would not be visible to a user. Light-emitting device 500 includes a plurality of light sources such as a Light-Emitting Diode (LED) provided in different positions. For example, the light sources may be provided proximate to the right and left sides of a casing of light-emitting device 500 as shown in the figure. Light-emitting device 500 is set up at a predetermined position (upper or lower space proximate to display 600, for example) so as to enable a position of sub controller 400 to be approximated with respect to light-emitting device 500 and display 600.

Display 600 is an output device that displays an image of a game and/or an image related to the message sharing service. Display 600 includes a screen 601. In one embodiment, display 600 is a stationary TV set, but is not limited to this. Display 600 may be any kind of device that can be used for displaying an image. Display 600 may include a built-in speaker for outputting a sound or that is connectable to a speaker device.

Figure 5:
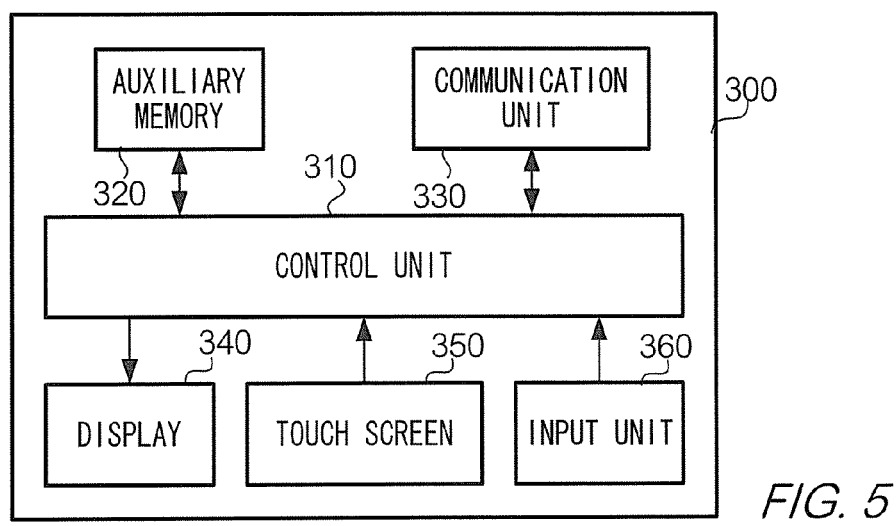
FIG. 5 is a block diagram showing an example non-limiting hardware configuration of a main controller.

FIG. 5 is a diagram showing a hardware configuration of main controller 300. Main controller 300 includes control unit 310, auxiliary memory 320, communication unit 330, display 340, touch screen 350, and input unit 360.

Control unit 310 controls all units of main controller 300. Control unit 310 includes a processing unit such as a CPU, main memory, and interface for inputting and outputting information between the units of main controller 300, and controls exchange of data to and from based station 200 by execution of a program. Image data of an image to be displayed on the screen of main controller 300 are generated by base station 200 and transmitted to main controller 300 by radio. Processing for displaying an image performed by main controller 300 is decoding of image data. Thus, main controller 300 can be designated as a thin client.

Auxiliary memory 320 is configured to store data used by control unit 310. Auxiliary memory 320 may be a flash memory. Auxiliary memory 320 may include a memory card or other detachable storage medium. Communication unit 330 is configured to communicate with base station 300. Communication unit 330 includes an antenna for communication with base station 200 by radio.

Display 340 displays an image. Display 340 includes a display panel containing a liquid crystal or organic electroluminescence element, and a drive circuit for driving the panel, and displays an image based on image data supplied from control unit 310.

Touch screen 350 detects an input operation by a user to generate coordinate data of a position on a screen 341 and output the generated coordinate. Touch screen 350 includes a sensor housed so as to overlap with screen 341, and a control circuit that generates a coordinate representing a position detected by the sensor, and outputs the generated coordinate to control unit 310. The sensor of touch screen 350 may be of a resistive type, capacitance type or other. Users input instructions by use of a finger or by use of a stylus or another pen-type device.

Input unit 360 also detects a user's input operation. Input unit 360 includes keys, buttons, and/or switches, and outputs information according to a user's input operation. The information may indicate that a key is being pushed. Any number of keys, buttons, and switches can be provided in input unit 360.

Figure 6:
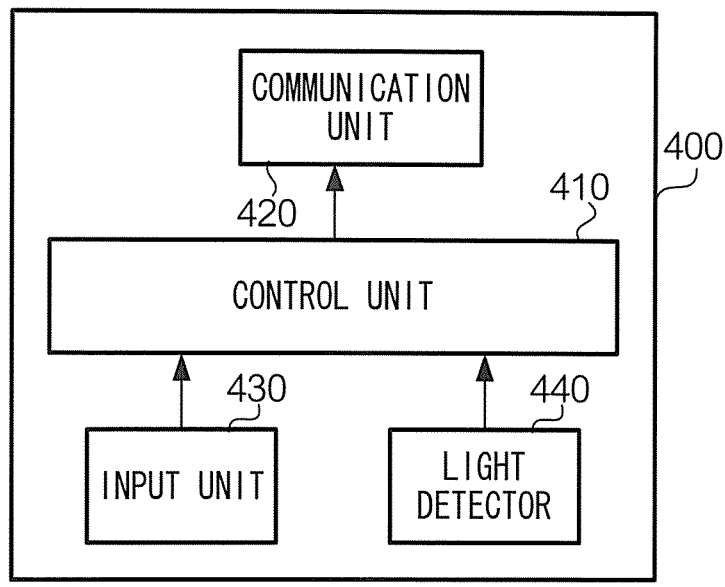
FIG. 6 is a block diagram showing an example non-limiting hardware configuration of a sub controller.

FIG. 6 is a block diagram showing a hardware configuration of sub controller 400. Sub controller 400 includes a control unit 410, communication unit 420, input unit 430, and light detector 440.

Control unit 410 controls all the units of sub controller 400. Control unit 410 includes a microprocessor or other processing device and memory, and controls transmission of data. Communication unit 420 includes an antenna for communication with base station 200. Input unit 430 includes hardware keys by which a user inputs instructions, and by which an input operation of a user is detected. Control unit 410 outputs information indicative of an input operation of the user.

Light detecting device 440 includes a light sensor (image capturing element) configured to detect light emitted by light-emitting device 500, and an image processing circuit configured to calculate coordinates based on the light detected by the light sensor. Light detecting device 440 calculates a position on a screen 601 at which the user points with controller 400 based on positions of the sources of the detected lights with regard to a position of sub controller 400. Accordingly, the light sensor is provided at the edge of sub controller 400, whereby light is caused to be directed toward display 600 when the user performs an input operation.

Figure 7:
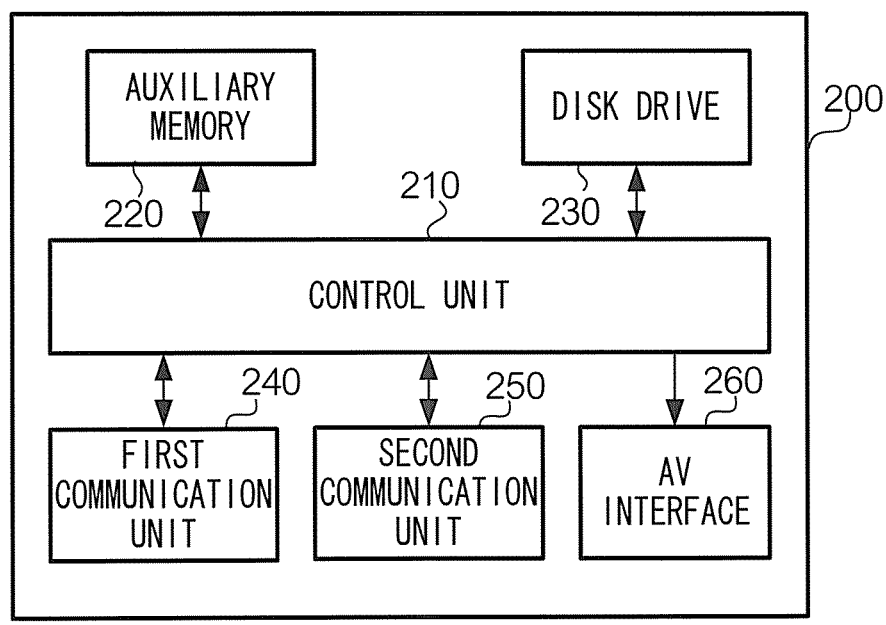
FIG. 7 is a block diagram showing an example non-limiting hardware configuration of a base station.

FIG. 7 is a block diagram showing a hardware configuration of base station 200. Base station 200 includes a control unit 210, auxiliary memory 220, disk drive 230, first communication unit 240, second communication unit 240, and AV (audio and visual) interface 260.

Control unit 210 is a computer configured to control all of the units of base station 200. Specifically, control unit 210 includes a processor including a CPU, GPU (Graphics Processing unit), DSP (Digital Signal Processor), memory including a main memory and VRAM (Video Random Access Memory), and an interface for transmitting/receiving data when communicating with the units of base station 300. Control unit 210 executes a program to control generation of image data transmitted to main controller 300 and/or display 600.

Auxiliary memory 220 is configured to store data used by control unit 210. For example, auxiliary memory 220 is a flash memory or hard drive. Alternatively, auxiliary memory 220 may include a detachable storage medium such as a memory card. Auxiliary memory 220 is also configured to store a program(s) executable by control unit 210 and data obtained by first communication unit 240 or second communication unit 240. A content including a game program that was downloaded via the online purchasing service by provided merchandize manager 114 via network 700 is stored in auxiliary memory 220. Preinstalled contents are also stored in auxiliary memory 220. Auxiliary memory 220 is also configured to store game objects described later and data for displaying user objects.

Disk drive 230 reads data from a storage medium such as an optical disk. For example, a game program or data necessary for executing a game is stored in the optical disk. Disk drive 230 may be configured to read data from an opt-magnetic disk, a semiconductor memory, or other types of storage medium. In gaming system 20, preinstalled contents and downloaded contents are stored in auxiliary memory 220, and contents stored in the optical disk can be executed or reproduced by control unit 210.

Communication unit 240 communicates with a node via network 700. Specifically, first communication unit 240 transmits and receives data to and from server 100 under control of control unit 210. Communication unit 250 communicates with main controller 300 and sub controller 400. Communication unit 250 may perform wireless communications by Wi-Fi, Bluetooth, infrared, or another type of communication protocol. In one embodiment, different communication protocols may be used respectively for communication with main controller 300 and with sub controller 400. In another embodiment, the same communication protocol may be used.

AV interface 260 supplies image and audio data to display 600. AV interface 260 includes one or more HDMI (High-Definition Multimedia Interface) terminals or other hardware interface terminals.

User information is stored in auxiliary memory 220 of base station 200. User information includes profile information of a user, information related to games or a message sharing service. In a case where base station 200 is used by two or more users, a set of user information is generated and stored for each user. In the present embodiment, when two or more sets of user information are stored in base station 200, the two or more users are handled as members of a family.

FIG. 8 shows an example of a data structure of user information. As shown in the figure, user information includes data items of "user ID," "gender," "date of birth," "interests," "comments," "avatar," "favorite communities," "number of posted messages," "number of feedback messages," "friends," "my favorite users," "users favoring me," "proficiency," "playing history," and "purchase history."

A part of the data items included in the user information is used for generating profile information. Profile information is information used by a user for introduction to other users of the message sharing service. A user may determine which data item(s) of the user information is visible to other users.

The user ID is a character string for use in identifying a user. In addition to the user ID, the user information may include a nickname of a user used in message sharing service. The data items of gender, date of birth, and interests are examples of attribute information representative of attributes of a user. Date of birth may be replaced with age. Comment is data presented to other users for self-introduction. Comment may be text data comprised of character codes or image data of handwritten characters, pictures, or the like.

Avatar data is data for specifying an object by which a user is identified in the message sharing service and in a game. Avatar data may include images of a face, hair style, clothing, and accessories. Avatar data does not necessarily include all the data items described above. Avatar data at least includes data items by which a user can recognize his/her avatar, or family members, friends, favorites from other avatars.

"Favorite communities" is data indicative of a particular community(s). A user can register a community(s) in which s/he often participates. "Number of posts" is data representative of a number of messages posted to message boards in communications by a user. "Number of feedback messages" is data representative of a number of evaluations of messages posted by the user, received from other users. In the present embodiment, evaluations may be selected from "agreeable," "sympathetic," or other positive responses to the posted message. In another embodiment, the evaluations may be selected from positive and negative emotions.

"Friends" and "my favorite users" represent a particular user(s) selected from other users. In the present embodiment, when a user specifies a particular user as a "friend" it means that the users endorse each other. Thus, a process in which a request is transmitted from the first user to the second user, the request is approved, and a request is transmitted to the first user by the second the user, is necessary for the first and second users to become "friends." Other users can be registered as "my favorite users" without approval from the other users. For example, users who are acquainted with each other in real life may be registered as "friend," or a person unknown to the user, or a person known to the user, but the person is not necessarily registered as a "favorite user."

"Users favoring me" indicates the number of other users who register the user as "a friend." "Proficiency" indicates a proficiency level in playing games. "Proficiency" may be determined by a user from that user's viewpoint, or, based on the playing history and/or the purchase history, determined by a service provider. "Proficiency" may indicate a general proficiency, or may be defined for games of separate genres (action, role playing, etc.).

"Playing history" is data representative of a history with regard to playing of a game(s) using the system. "Playing history" includes a game ID, date and time of playing a game(s), total playing time and the like. When the game can be played by multiple users, "the playing history" of a user may include a user ID(s) of another user(s) who has played the game together with the user. "Playing history" may include data relating to all instances of playing of a game. Alternatively, "playing history" may include data of a recent predetermined number of instances of playing of the game, or playing performed within a predetermined period of time. "Playing history" may also include activities in a community, which include viewing of the message board, posting messages, and evaluation of messages relating to the game, in addition to a playing history of the game.

"Purchase history" is data representative of a history of purchasing games or obtaining other content by communicating with merchandize manager 114 for online purchasing. "Purchase history" includes a game ID, date and time of purchasing games, prices, and the like. Similarly to the playing history, the purchase history does not necessarily include data for all purchases made by a user.

"Playing history" and "purchase history" are stored in base station 200. Alternatively, server 100 stores "playing history" and/or "purchase history" for all the users. In this case, base station 200 obtains data only for a relevant user(s) from server 100, to be used by base station 200.

The overall configuration of information processing system 10 has been explained. By the configuration, users can play games or communicate with other users using the message sharing service. The message sharing service of the present embodiment enables users to generate a community for topics relating to games so as to post messages on a message board of the community, and to exchange data with a particular user(s). In addition, users can evaluate messages posted by other users.

The community can be regarded as a unit of a group of the message sharing service, in which users can communicate with others. Messages are shared in each community. In one embodiment, a community(s) is associated with a game(s). In another embodiment, a community that is not associated with a particular game(s) is generated. For example, a community is generated for a particular game developer. One or more communities may be generated for a single game.

A user can use the functionalities described above by inputting predetermined instructions after a start screen is displayed. The start screen is an initial screen that appears first when gaming system 20 is turned on. As described above, gaming system 20 performs the functionality of enabling a user to play a game and the functionality of using the message sharing service. Thus, the start screen functions as a menu screen for activating both functionalities. Specifically, the start screen enables the user to select and execute a game that the user wishes to play, or launches a message sharing service. It is noted that the functionalities are not independent of each other, but are interrelated. Specifically, when the functionality of selecting and playing games is initiated, the functionality enables the user to refer to data in the message sharing service. Alternatively, after a game is selected, the functionality enables the user to select playing of the game or viewing a community of the game. Gaming system 20 performs the functionality of purchasing a content playable in gaming system 20 by communicating with merchandize manager 114. Thus, the start screen also functions as a menu for activating the purchasing functionality.

In the present embodiment, the start screens are a screen 341 of main controller 300 and a screen 601 of display 600. Base station 200 transmits image data to main controller 300 and display 600 to control a display of the start screen.

Figure 9:
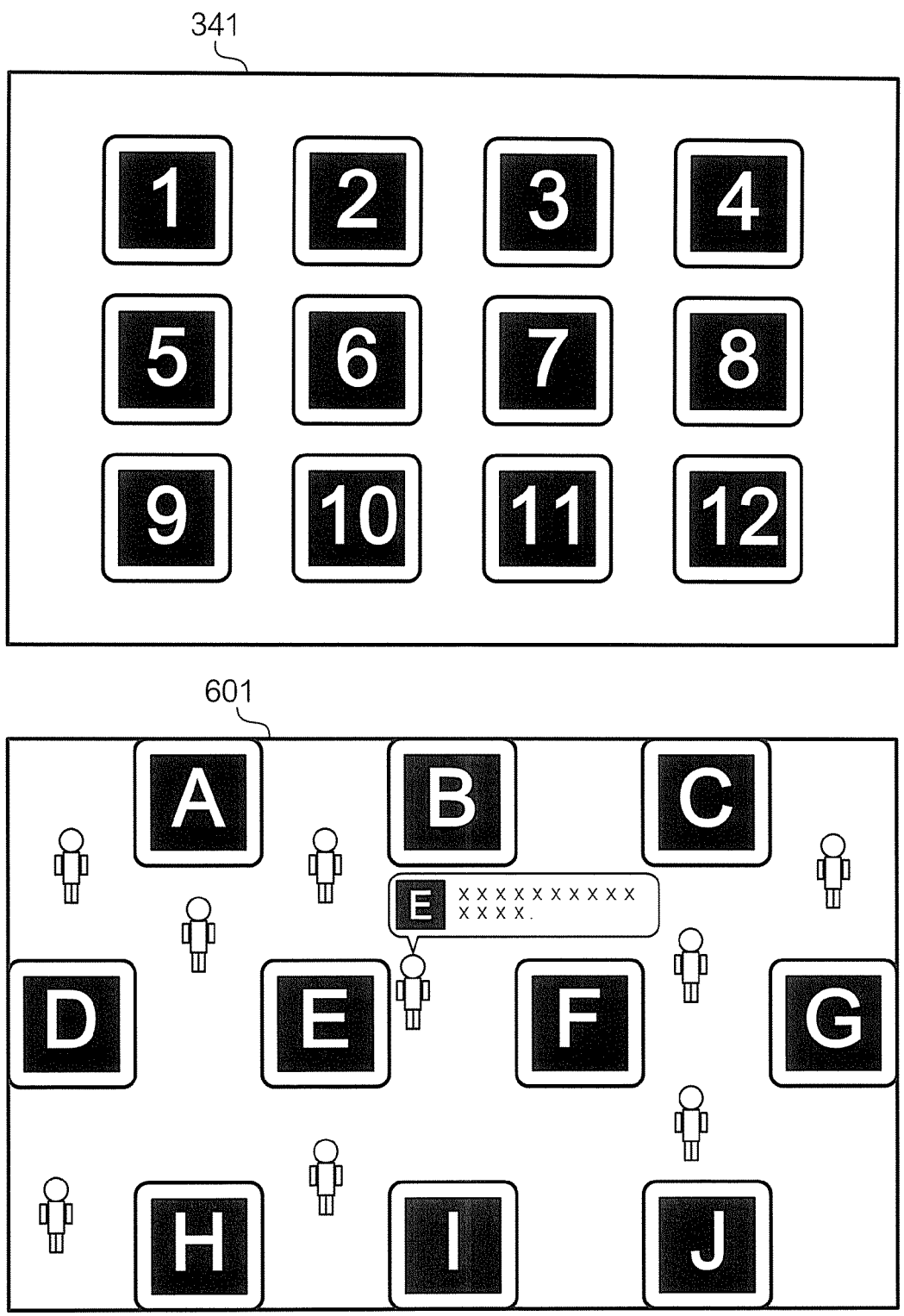
FIG. 9 shows an example non-limiting start screen.

FIG. 9 shows an example of the start screen. In the figure, start screens 341 and 601 are hereinafter referred to as "the first start screen" and "the second start screen," respectively. The first start screen and the second start screen may be switched. For example, in response to a predetermined input by the user, the first and second start screens are switched such that the first start screen is displayed on screen 601 and the second start screen is displayed on screen 341.

The first start screen includes a predetermined number of icon(s) of games that are currently executable for the reason that the user purchased them or they were preinstalled. Specifically, game programs stored in auxiliary memory 220 or an optical disk inserted in disk drive 230 is recognized as executable.

In the following description, it is assumed that twelve icons denoted by numerals "1" to "12" respectively represent playable games. In one embodiment, the first start screen includes a list of all the playable games. Alternatively, only some of the icons of the determined games are displayed, for which a predetermined number of times the user has played or a total number of playing times are determined based on a playing history of the user. The user can indicate readiness to play a game by selecting an icon from the displayed icons. The user may touch a screen 341 with his/her finger, or by pushing a key of input unit 360 to select an icon. In the present embodiment, only icons of presently executable games are displayed on the first screen.

The second start screen includes icons of currently executable games and icons of currently unexecutable games. A currently unexecutable game is a game that the user cannot play since the user has not purchased it yet. The currently unexecutable game includes a game that will become playable when the user buys it by communicating with merchandize manager 114 and downloading it. In one embodiment, the currently unexecutable game includes a game that cannot be executed and an executable trial version of a game, which has limited functionality. In this case, the restriction to the functionality of the game can be removed by payment of a predetermined amount purchase fee. Assuming that ten icons indicated by letters A to J are icons of games that have limited functionality, in one embodiment, the second start screen includes only icons of the currently unexecutable games.

In the second start screen, in addition to icons of games, avatars of users are included. The users whose avatars are displayed include a current user (i.e., the player of a game), family members of the user, friends, favorite user, other users who have once played or recently played a game that the user has once played or recently played, and the like. Alternatively, the second start screen includes avatars of an unspecified number of users who have no connection with the player, in addition to the particular users described above. Hereinafter, an icon of a game and an avatar are referred to as "a game object" and "a user object," respectively. Also, an area of the screen at which the game object and the user object can be disposed is referred to as "a virtual space." The user can specify objects displayed in the second start screen using sub controller 400.

Optionally, information associated with the user object may be displayed near the user object. For example, information associated with the user object is information on activities in a game or the message sharing service. Specifically, the information may include information related to games that the user has played (in other words, information generated based on a playing history), information related to a community or message board of the community to which the user posted a message, posted messages, or the like. In the present embodiment, posting to a community means posting a message related to a game, since a community is created for each game. The displayed information may include profile information including a user ID and comment, which is shown in FIG. 8. For example, the information may be displayed adjacent to a game object in a balloon object. Alternatively, the information may be displayed in response to manipulation of the respective user object by the player. Hereinafter, an object indicative of information associated with a user object is referred to as "a balloon object." The balloon object may include text, an image, a handwritten memo, or the like. The handwritten memo is input via touch screen 350 of main controller 300.

Base station 200 displays multiple user objects moveable in the virtual space. For example, base station 200 controls user objects such that when there is a predetermined association between a game of a displayed game object and a user object, the user moves toward the game object and stays around the game object while continuing to move. The association between a game and user object is determined based on how the user has been involved in the game or a community of the game. For example, an association is determined based on whether a user of the user object has played the game, or posted a message to a community related to the game or evaluated a message posted in the community. User objects are displayed on the screen in such a manner that a user can clearly recognize that a game object is that of a game in which many users are involved. Thus, a user can easily recognize whether the games presently attract users to provide topics in the message sharing service.

In one embodiment, base station 200 displays the second start screen in a single display area, in which game objects of games that are presently executable and game objects of games that are presently unexecutable in the second start screen are included. This enables a user to recognize how a game owned by the user attracts other users. In addition, a user will be informed of popular games that the user does not have. Furthermore, in a case that the displayed user objects include an object of a particular user, i.e., a family member, friends, or the like, the user can be kept informed of which games interest an associated user.

Figure 10:
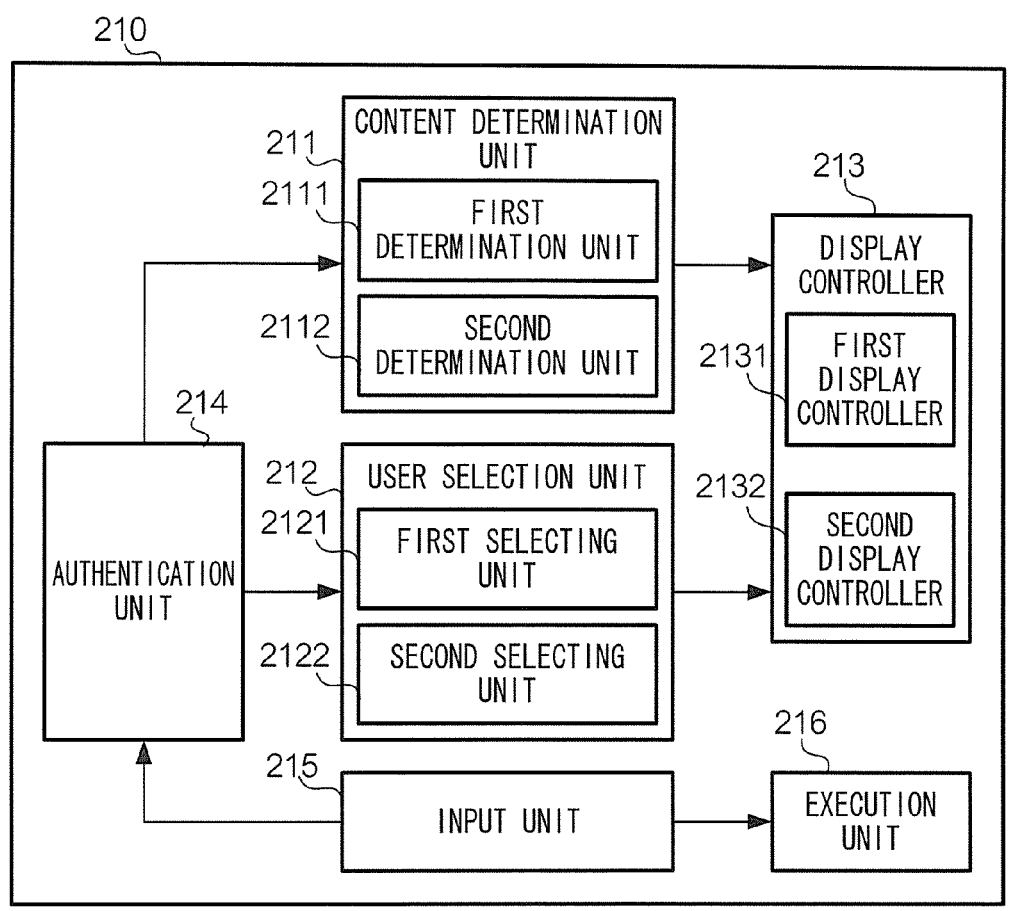
FIG. 10 is a block diagram showing an example non-limiting functional configuration of the base station.

FIG. 10 is a block diagram of a functional configuration of base station 200 that performs the display control described above. A description of the block diagram is especially directed to functionalities relating to a display control of the start screen, selected from among all of the functionalities of control unit 210. Control unit 210 executes a predetermined program to implement functionalities of content determination unit 211, user selection unit 212, display controller 213, authentication unit 214, input unit 215 and execution unit 216.

Content determination unit 211 determines a game of a game object to be displayed on the start screen. Specifically, content determination unit 211 includes a first determination unit 2111 and a second determination unit 2112. First determination unit 2111 selects a game to be displayed on the first start screen, from games that are presently executable in gaming system 20. In one embodiment, all presently executable games are displayed on the first start screen. Second determination unit 2112 determines a game(s) of a game object(s) to be displayed on the second start screen. Specifically, unlike first determination unit 2111, second determination unit 2112 determines both a game(s) selected from presently executable games and a game(s) selected from presently unexecutable games as games to be displayed on the second start screen.

First determination unit 2111 extracts from base station 200, all the stored executable programs for display on the first start screen. Alternatively, first determination unit 2111 extracts only a part of the executable games bade on the purchase history and/or playing history.

Also, first determination unit 2111 identifies distinctively the player and other users (family members) using authentication results obtained by authentication unit 214, and determines a game for each identified user based on a history of each user. In other words, first determination unit 2111 can identify a game(s) frequently played by a user who is currently playing a game and a game(s) frequently played by other users (family members) who are not currently playing a game. In this way, a user who is currently playing a game is able to see which games a family member(s) plays frequently.

Second determination unit 2112 determines a game(s) based on data supplied from base station 200. Specifically, second determination unit 2112 obtains game information on a popular game(s), which information is selected by recommendation manager 112 from server 100, and determines a game(s) to be displayed on the second start screen based on the obtained game information. In one embodiment, second determination unit 2112 determines to display all popular games identified on the basis of obtained game information. Alternatively, second determination unit 2112 selects a part of the popular games to be displayed. Also, second determination unit 2112 extracts a part of executable games stored in base station 200 for display on the second start screen. For example, first determination unit 2111 determines games that the user has played for a longer amount of time in total or during a previous play session, among the games purchased by the user. First determination unit 2111 may also determine games to be displayed on the second start screen, which the games had been often played by the user before a few months ago and rarely been played thereafter. Second determination unit 2112 determines games to be displayed on the second start screen by adding the games obtained from server 100 and a part of the executable games stored in the base station 200.

User selection unit 212 selects users of user objects to be included in the second start screen. Specifically, user selection unit 212 includes first selecting unit 2121 and second selecting unit 2122. First selecting unit 2121 selects a user(s) from particular users including the player. Second selecting unit 2122 selects a user(s) from users other than the particular users.

First selecting unit 2121 determines a user(s) based on user information stored in base station 200. For example, first selecting unit 2121 selects a predetermined number of users from users belonging to the family members, and friends. In on embodiment, all the family members, friends, and favorites are selected. In another embodiment, the number of selected users from each category described above is limited. The particular user(s) may include at least one of the player, family members, friends and favorite users.

Second selecting unit 2122 selects a user(s) other than the particular users based on data other than data for base station 200. Specifically, users are selected based on user information obtained from server 100. In one embodiment, the number of selected users is determined based on a capability of base station 200 or in accordance with a number of the particular users. The reason for this is that since the displayed user objects are moveable, if a large number of user objects are displayed, there is a possibly that the objects will not be able to move smoothly and/or a delay may occur in other processing performed by base station 200 occurs.

Display controller 213 controls display of an image, performed by main controller 300 and display 600. Specifically, display controller 213 supplies image data to main controller 300 and display 600 for display control. The image may be a stationary image or a moving image. Display controller 213 includes a first display controller 2131 and second display controller 2132.

First display controller 2131 is responsible for controlling a display of game objects included in an image displayed by display controller 213. First display controller 2131 displays game objects of the games determined by determination unit 211 in both the first start screen and the second start screen. Specifically, the game objects of the games determined by the determination unit 211 are disposed in the first start screen, and game objects of the games determined by the determination unit 212 are disposed in the second start screen. Second display controller 2132 is responsible for controlling display of user objects included in the image displayed by display controller 213. Second display controller 2132 disposes user objects of the users selected by user selection unit 212 in the second start screen. Second display controller 2132 is also responsible for controlling display of balloon objects displayed in accordance with respective user objects.

Authentication unit 214 authenticates users. Upon receipt of an input for log-in by a player, authentication unit 214 checks that the player is one of the family members based on user information stored in base station 200. After authorization of the player as a family member, i.e., a registered user, authentication unit 214 accesses server 100 via network 700 to inquire whether the user is qualified to use the message sharing service or participate in communities. For example, for a user who does not fulfill a predetermined condition in regard to age or other attributes, a part of the services provided by the system may be restricted.

Input unit 215 receives an input made by a user. Specifically, input unit 215 identifies a position or operation designated by the user based on a received input. The operation information may include two sets of data, which includes operation information and position information and the data sets are transmitted by main controller 300 and controller 400, respectively. Input unit 215 is capable of receiving inputs to the first start screen and the second start screen independently.

Execution unit 216 performs a processing in accordance with a user operation. Execution unit 216 performs a processing based on an input received by input unit 215. For example, upon receipt of an input of designating a user object or game object to the first or second start screen, execution unit 216 recognizes the designated object and performs a processing corresponding to the designated object.

Figure 11:
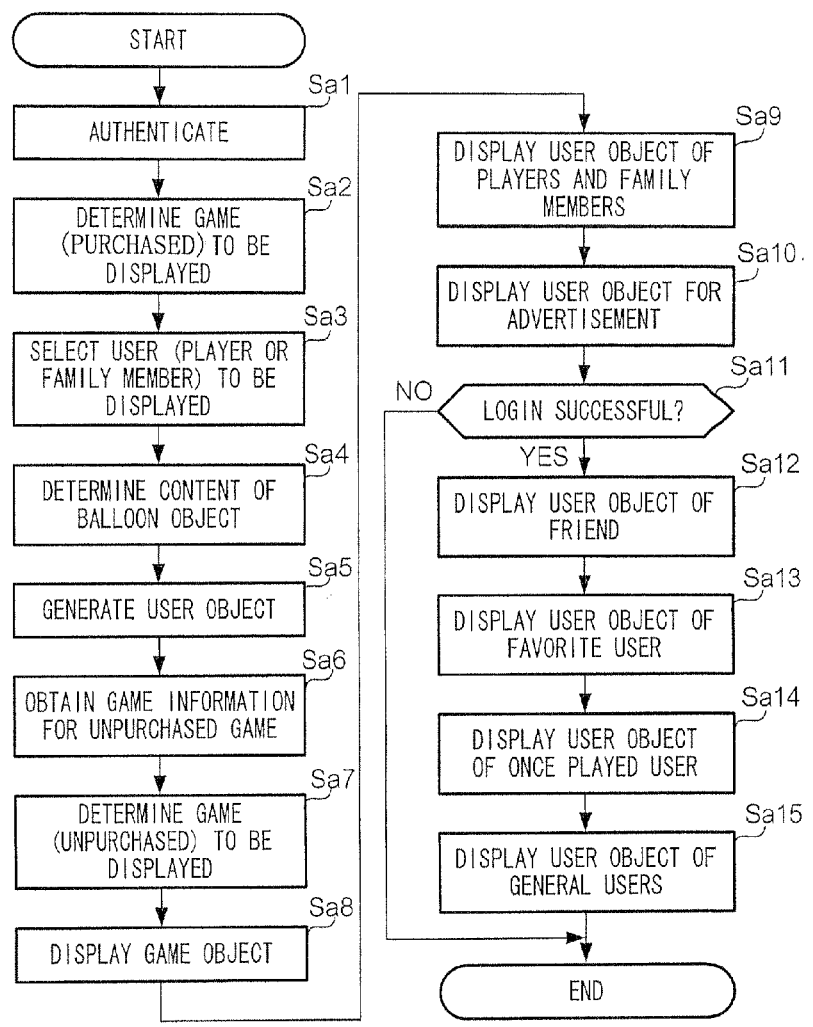
FIG. 11 is a flowchart showing an example non-limiting process executed when the base station displays a start screen.

FIG. 11 is a flowchart showing an initial processing performed when base station 200 displays the start screen. Firstly, control unit 210 initiates an authentication (step Sa1). Specifically, control unit 210 identifies the player as a family member based on account information input by the player, or the like. Next, control unit 210 initiates a process for logging into the message sharing service. Control unit 210 transmits data used for logging into to server 100 via network 700. A user ID and/or password may be used for authentication of a user. Other known methods for authentication can be employed. It takes time for server 100 to complete authentication for logging into the message sharing service. Prior to completion of the authentication, control unit 210 initiates processes explained below using the data stored in base station 200, until authentication is completed and login to the message sharing service is enabled. It is noted that the processes explained below can be initiated before receiving data from server 100.

For example, control unit 210 determines a part of the games of which game objects are to be displayed on the start screen (step Sa2). Specifically, control unit 210 identities a purchased game, i.e., presently executable games of all the games that can be displayed. In other words, control unit 210 determines games to be displayed on the first start screen. Control unit 210 determines a predetermined number of games of all the stored games to be displayed as game objects.

Control unit 210 may display a part of the determined games also on the second start screen. For example, games that have been played frequently (i.e., played for a long amount of time in total) by the current player or by other family members, which time is determined based on a playing history, are displayed. Preferably, a ratio between the numbers of purchased games and unpurchased games included in the second start screen is determined in advance. In one embodiment, base station 200 may determine a ratio. Alternatively, the ratio can be changed by users.

Control unit 210 selects a user(s) such that a user object(s) of the user(s) is displayed on the second start screen (step Sa3). The user(s) selected by control unit 210 is a user(s) identifiable by the user information stored in base station 200 (i.e., local storage), which includes at least one of the player and a family member of the player. In step Sa3, control unit 210 obtains user information (playing history and posting history) of the selected user(s) from user manager 113.

Upon selection of a user(s) to be displayed, control unit 210 determines details of a balloon object for each of the user object(s) of the selected user(s) stored in base station 200 (step Sa4). For example, control unit 210 generates a message "Recently, I have been playing "A" (Title of a game)" referring to the playing history stored in base station 200. Alternatively, control unit 210 stores messages posted by users for inclusion in a balloon object.

Next, control unit 210 generates a user objects(s) of the user(s) to be displayed (step Sa5). In this example, a user object is a 3D object of which appearance is designed based on a human. Control unit 210 performs a 3D modeling for the user objects. In another embodiment, the user objects does not a 3D object or human-like shape.

It is noted that processes from steps Sa2 to Sa5 are not initiated in the order described above. The processes can be carried out collectively after necessary data is supplied by server 100.

Control unit 210 obtains game information on popular games (step Sa6) from recommendation manager 112. Control unit 210 using the obtained data, determines games (unpurchased game) to be displayed on the second start screen (step Sa7). A popular game is not necessarily a game the user has not purchased. When the popular games include a game purchased by the user, all the popular games can be handled as purchased games with regard to the user. In step Sa7, control unit 210 obtains, from server 100, a game ID, game title, icon, access information including a URL for purchasing the game by the online purchasing service provided by merchandize manager 114, for each of the unpurchased game to be displayed on the second start screen. It is noted that game IDs, game titles, icons, access information including URLs for purchasing the games in the online purchasing service game ID, for all the games are stored in server 100.

Next, control unit 210 displays a predetermined number of game objects in the first start screen and the second start screen (step Sa8). At this moment, game objects are displayed on the first start screen and the second start screen and a user object is has not displayed.

Optionally, control unit 210 narrows down the unpurchased games. For example, in a case where a number of sets of game information, the number being equal to the upper limit of game objects displayable on the second start screen, is obtained from server 100 when game objects of some of the purchased games are displayed on the second start screen, control unit 210 deletes a predetermined number of data sets of purchased games included in the obtained game information. The games excluded from a list of displayable games may be determined by the service provider or base station 200 in accordance with predetermined rules. In one embodiment, control unit 210 refers all the sets of the game information obtained by server 100 for determination of the excluded games.

After displaying the game objects, control unit 210 displays on the second start screen user objects of the users (the player and family members) selected in step Sa3 (step Sa9). Specifically, control unit 210 displays the user objects at a predetermined initial position(s), and gradually changes positions of the user objects. More specifically, the user objects move such that each user object approaches a game object associated with the user object. The initial positions of the user objects may be different from each other or shared by multiple users objects.

Control unit 210 also displays a user object generated by the service provider for the purpose of announcement on the second start screen (step Sa10). This user object is neither relevant to a particular user nor necessarily associated with a particular game. The announcement-purpose object provides users with information using a balloon object. Information relating to the announcement-purpose object, which includes an avatar, announced messages, and information of a related content, is obtained from server 100.

Control unit 210 may adopt a different appearance for a part of the user objects depending on user attributes. For example, it is possible to change accessories or colors of clothes of user objects depending on the player and family members. Similarly, it is possible to assign particular accessories or clothes of a particular colors depending on whether the user is friends or favorite users. When an appearance of a user object differs from attributes (type) of user, a user can recognize with ease attributes of users displayed by user objects.

Next, control unit 210 determines whether the authentication is completed after a successful login to the message sharing service (step Sa11). After a successful login to the message sharing service, control unit 210 can display more user objects. When the login to the message sharing is not successful because of a connection error or other reasons, control unit 210 terminates the processing shown in FIG. 11 without performing the subsequent steps.

When the login is successful, control unit 210 obtains, from user manager 113, user information (user name, profile, avatar, and information on activities including the playing history and the posting history) of users in the friends and favorite users, and user objects of the users (steps Sa12, Sa13). Also, control unit 210 obtains, from posting manager 111, messages posted by the users. Each message includes a message and information indicative of an emotion of a user when posting (hereinafter referred to as "emotion information". Next, control unit 210 obtains user information of users who have played a game together with the player based on the playing history stored in base station 100, and displays a user object thereof (step Sa14). In addition to the generation of the user objects, control unit 210 generates contents of balloon objects, similarly to the process in step Sa4. The contents of balloon objects are generated, based on messages provided by message manager 111 or the playing history and posting history provided by user manager 113. For example, a generated content includes a message extracted from a posting history. It is possible to change an appearance (expression, complexion, or the like) of an avatar or a design of a balloon object based on the emotion information related to a message.

Optionally, control unit 210 obtains user information of users other than the users whose user objects have been displayed, and displays user objects based on the obtained user information (step Sa15). The other users (hereinafter referred to as "general users" may be users selected randomly or users who have played a popular game. Although the number of the other users displayed by control unit 210 is restricted depending on a processing capability of base station 200, preferably a large number of user objects of general is displayed. In this way, a large number of users objects activated in the virtual space will enable a player to determine with ease a popularity of games.

In one embodiment, control unit 210 displays the user objects of the general users displayed at one time. Alternatively, control unit 210 gradually increases displayed user objects of the general users until reaching an upper limit of displayable objects on the screen, to depict users entering the virtual space. In this case, an amount of processing required to be carried out by base station 200 is reduced.

Figure 12A:
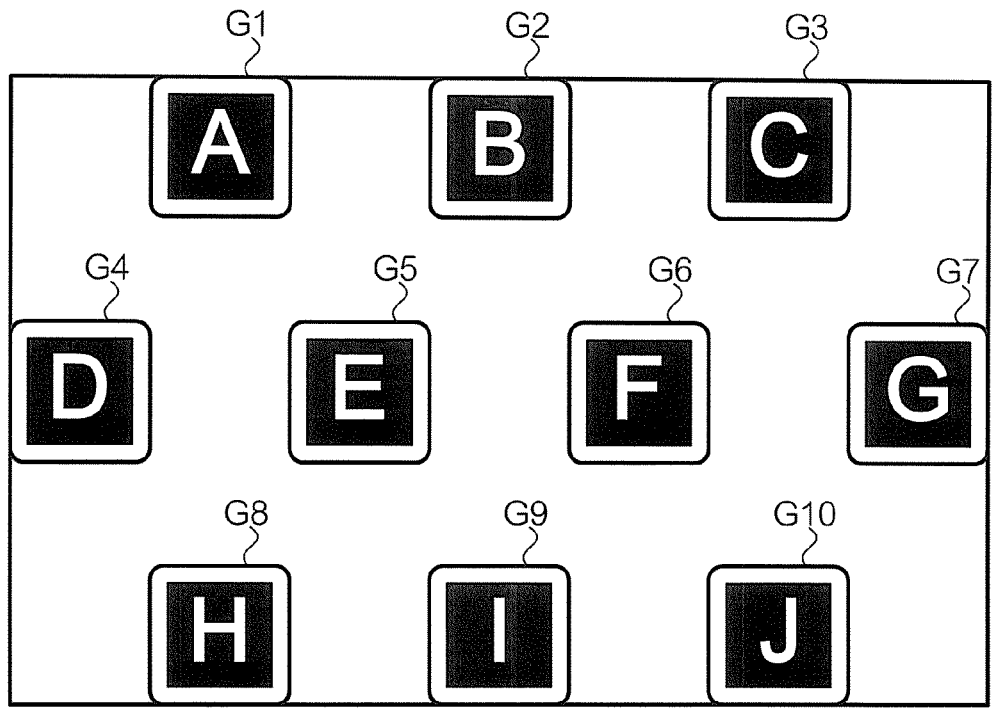
FIGS. 12A and 12B show an example non-limiting screen transition of the second start screen.

FIGS. 12 and 13 show a screen transition of the second start screen. Initially, game objects (G1 to G10) are displayed, and a user object is not displayed on the second start screen, as shown in FIG. 12A. This corresponds to a state following completion of step Sa8 shown in the flowchart of FIG. 11.

Figure 12B:
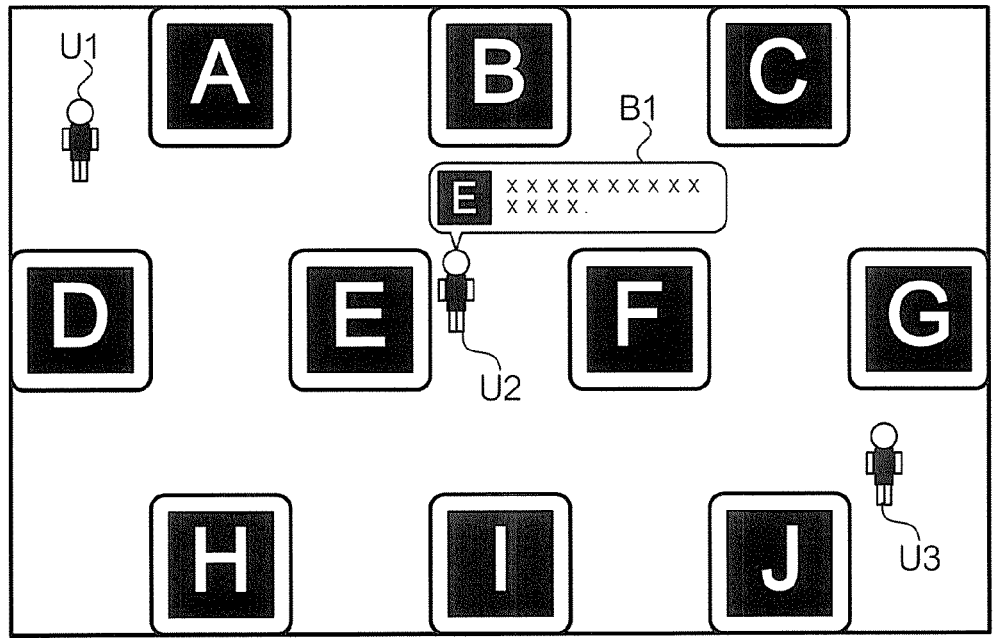

Next, the second start screen changes as shown in FIG. 12B, user objects (U1 to U3) are displayed. Some user objects may be displayed together with balloon objects (B1). A displayed balloon object interferes with other objects, and therefore it is preferable to limit a number of balloon objects displayable at one time. A maximum number may be three, for example. Also, an object accompanying a balloon object changes one at a time over a predetermined period of time.

Figure 13A:
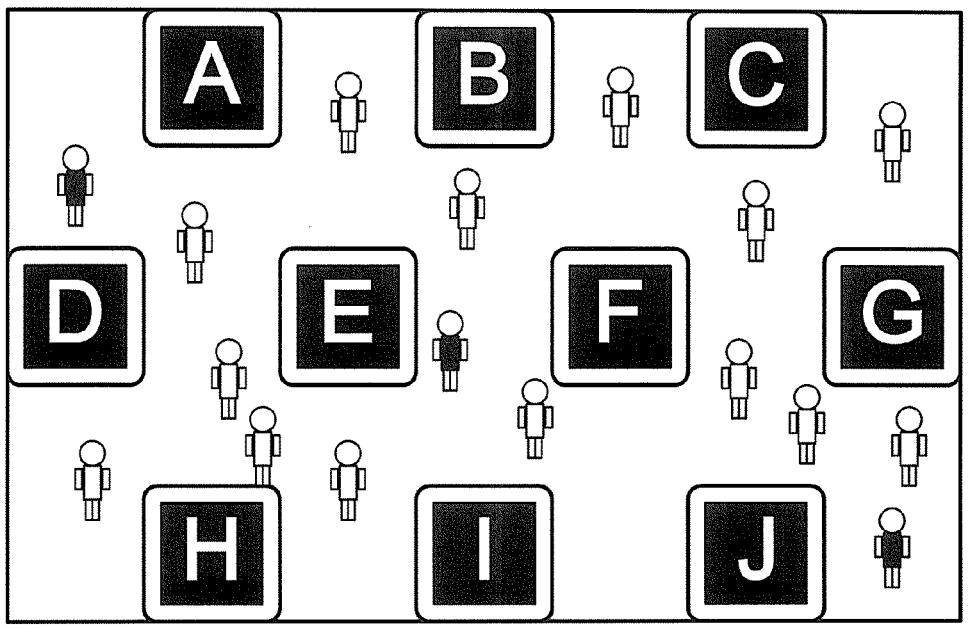
FIGS. 13A and 13B also show an example non-limiting a screen transition of the second start screen.

On the screen shown in FIG. 12B, only user objects of users including the player and the family members are displayed. This corresponds to a state after the process of step 9 in the flowchart shown in FIG. 11 is completed. After a successful login, the number of user objects increases and a screen change is caused as shown in FIG. 13A. This corresponds to a state after the process of step 15 in the flowchart shown in FIG. 11 is completed. User objects of the particular users and general users are depicted so that they are mutually distinctive. In the example shown in FIG. 13, the distinction is realized by changing colors of bodies of avatars.

Figure 13B:
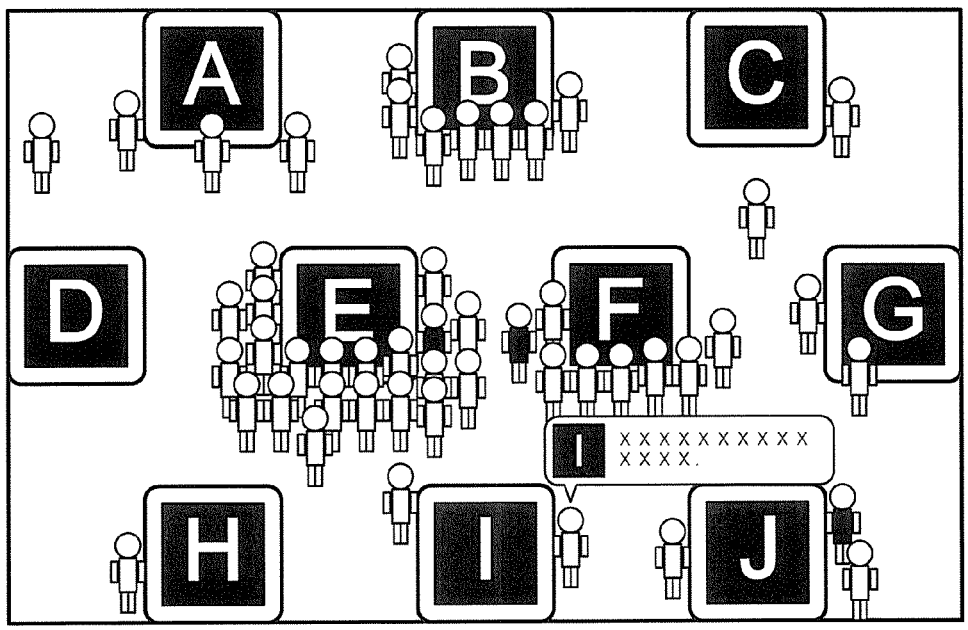

An user object is attracted to a particular game object when a condition exists that there is an association between user information corresponding to the user object and data relating to the particular game. For example, when a user plays a game or participates in a community relating to the game by posting a message or receiving an evaluation responsive to a message posted by the user, the game information is included in/user information stored in base station 100 or is provided by user manager 113. A displayed user object of the user is controlled such that it moves toward a game object of the game and stays in the vicinity of the game object. FIG. 13B shows an example of movement of the user object. In this example, a game "E" corresponding to game object G5 is a game in which a largest number of users are involved. Thus, each of the user objects is disposed in accordance with an involvement of a user of the user object.

Figure 14:
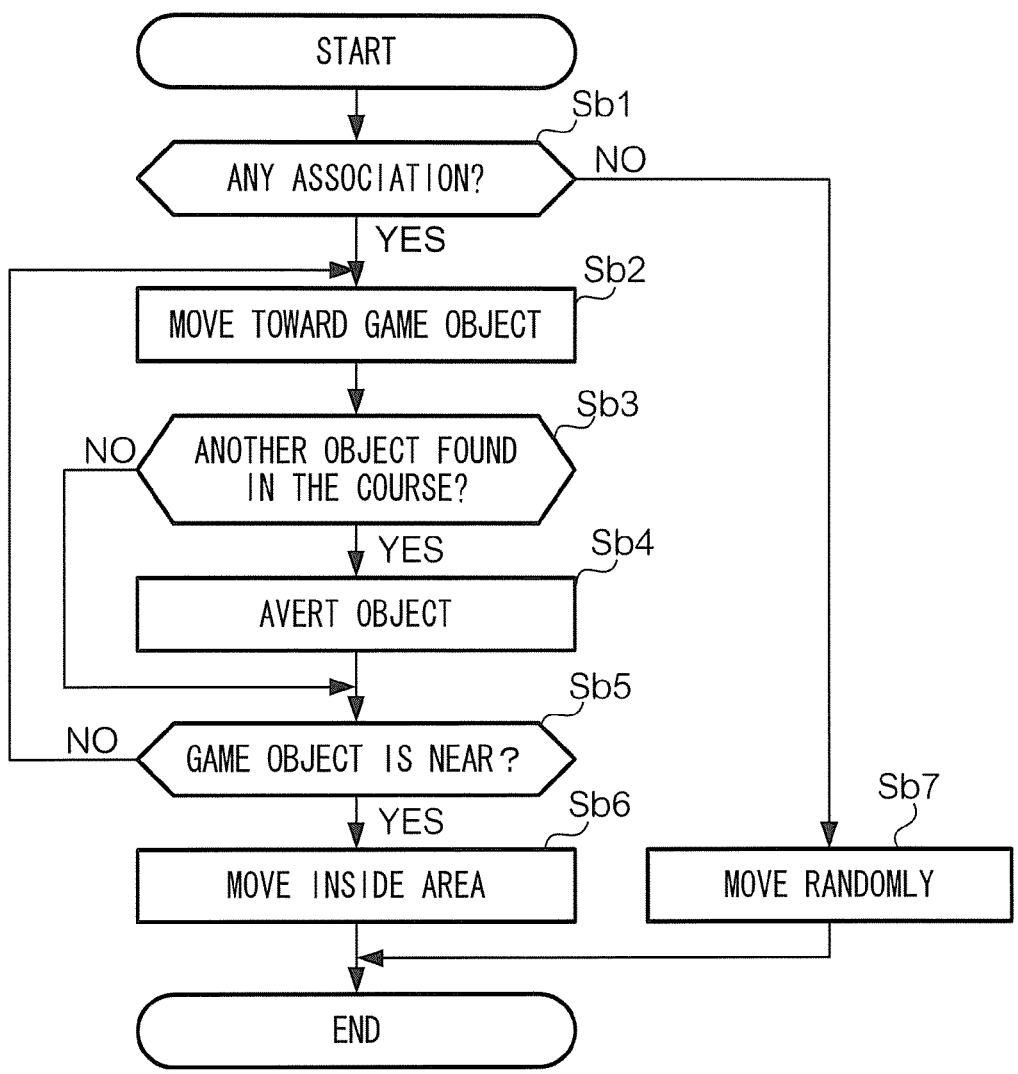
FIG. 14 is an example non-limiting flowchart showing migration of a user object.

FIG. 14 is a flowchart showing a processing of moving user objects. After setting a user object at its initial position, base station 200 controls movement of the user object by use of the algorithm described above. Base station 200 controls movement of all displayed user objects.

Control unit 210 refers to user information of a user corresponding to a user object for control (hereinafter, "an intended user object") to determine whether the user is associated with a game of any of the game objects displayed on the second start screen (step Sb1). Specifically, control unit 210 checks whether data of activities represented by the playing history, purchase history, posted messages or evaluation of messages, which is associated with the games, is stored. When a single user is associated with two or more games, control unit 210 selects a game in which the user has participated frequently. For example, control unit 210 determines a game played most recently, a game played for a longer time in total, or played for a highest number of times, a game for which a related message was posted most recently, a game for which related messages were posted most recently, a game for which evaluations for a posted message(s) were received most frequently, or a game for which a highest evaluation for a posted message(s) was received, as a game played most frequently.

When three is an association between the user and a game(s) described above, control unit 210 causes a user object of the user to move toward a game object of the game (step Sb2). In one embodiment, control unit 210 causes the user object to move straightway. In another embodiment, the user object may be caused to move along a circuitous course, with a random element being introduced in selecting a route, or with stops being initiated for a predetermined period of time, so that the user object moves to the game object within a predetermined period of time. Similarly, other variations in movement can be adopted. Simply stated, user objects can take any route over any period of time to reach a target game object.

Next, control unit 210 determines whether there is another object in the course of the intended user object, and if such an object exists, a distance from the intended user object to the found object is within a predetermined distance (step Sb3). The found object is an obstacle for the intended user object. The found object may be a user object or a game object (except for a target game object). Control unit 210 causes the intended user object to move around the obstacle object (step Sb4).

Next, control unit 210 determines whether the intended user object is in an area adjacent to the target game object (step Sb5). The area adjacent to a game object is defined as a predetermined range surrounding the game object. Hereinafter, the area is referred to as "a rest area." If the intended user object is in a rest area of the target game object, control unit 210 controls the intended user object to remain in the rest area, that is, to prevent the user object from leaving the rest area (step Sb6). Similarly to a control of steps Sb3 and Sb4, control unit 210 controls user objects to move around obstacle objects in the rest area.

In a case where a large number of user objects move to a single game object and stay in a rest area of the game object, there is a possibility that some of the user objects are accidentally pushed out of the rest area. In this case, control unit 210 controls the pushed user objects to come back to the rest area. As a result, there are user objects entering and leaving the rest area at a border of the rest area. Viewing such movements, the player will feel as if the user objects are very active near the game object.

If the intended user object is not in the rest area of the target game object yet, control unit 210 repeats a series the processes starting from of step Sb2, to approximate the intended user object to the target game object. Control unit 210 repeats the processes until the intended user object enters the rest area.

If a determination perfumed in step Sb1 is negative, that is the user is not associated with a game, control unit 210 causes the user object to move randomly with no particular destination (step Sb7). Similarly to the process of steps Sb3 and Sb4, control unit 210 controls the user object to avoid obstacle objects.

In accordance with the foregoing, a game object of a popular game attracts a large number of user objects. A player is provided with information on a popularity of a game based on a density of user objects around a game object of the game. In addition, since display user objects are active in an area with higher density, the area becomes noticeable and therefore attracts a user's attention. In one embodiment, characteristic motions may be given to at least a part of user objects of the particular user(s) including a family member and friend. For example, user objects of particular users may "walk" differently to general user objects, or a characteristic movement may be given to a part of the user object when the object is " walking". In this way, user objects of particular users are made more noticeable.

A size of a rest area may be changeable. For example, control unit 210 changes a size of a rest area of a game object depending on a number of user objects in the rest area, that is, the number of users associated with a game of the game object. Specifically, control unit 210 introduces a threshold for a number of displayable user objects, and expands the rest area when the number of displayed user objects exceeds the threshold. Alternatively, control unit 210 gives a larger size to a rest area in which more user objects are displayed without such a threshold.

In this case, control unit 210 may set a ratio of expansion of the rest area to be lower than a ratio of increase of the number of user objects displayed in the rest area. This means that a density of user objects in the rest area increases when a number of user objects displayed in the rest area is increasing and an area of the rest area is expanding. By doing so, a change of the rest area is enhanced when a density is increasing rather than decreasing.

It is possible to receive an input instruction of the player to specify at least one of a game object, a user object, and a balloon object by base station 200. Upon receipt of an input instruction on an object, base station 200 performs a processing corresponding to the specified object. In one embodiment, this process is performed with the process shown in FIG. 11 in parallel. In another embodiment, this process is initiated after completion of the process shown in FIG. 11, by which a predetermined number of user objects are displayed.

Figure 15:
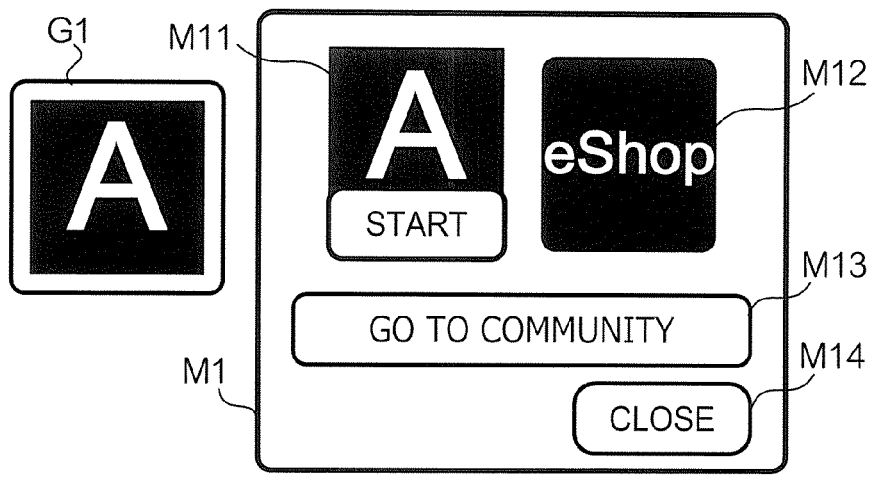
FIG. 15 shows an example non-limiting menu displayed in response to an input of an instruction for designating a game object.

FIG. 15 shows an example of a menu M1 displayed when an instruction of specifying a game object input by main controller 300 or sub controller 400 is received. Menu M1 is displayed near game object G1. Menu M1 includes a start icon M11, icon M12 linked to the online purchasing service, icon M13 liked to a community, and close icon M14. Start icon M11 is selected for starting a game of the specified game object. Icon M12 is an icon linked to a web site as a retailer of the game, which is implemented as a hyperlink selected for purchasing the game. Icon M13 is selected to participate in a community related to the game, view messages posted on a message board, or post a message on the message board, which is implemented as a hyper link to a web site of the community. Close icon M14 is selected for closing menu M1 to retrieve the screen before the game object is specified.

A process performed by base station 200 subsequent to a display of a menu M1 together with a game object differs between a case where a game of the displayed game object is a purchase or a currently executable game is displayed, and a case where the display game is a unpurchased or a currently unexecutable game is displayed. Specifically, if a game has already been purchased, base station 200 executes the game when start icon M11 is selected. If the game has not been purchased, base station 200 does not execute the game and displays an error message to notify the player that the game cannot be played.

Alternatively, base station 200 does not display start icon M11 in a menu M1 for an unpurchased game, thus notifying the user that the game cannot be played by the user. Alternatively, when a start icon M11 included in menu M1 for an unpurchased game is selected, base station displays a message such as "You cannot play this game until you purchase it. Do you wish to access the web site to purchase it online?", so as to prompt the user to access the site. This process is an example of activating a game or other contents for the user to play.

Figure 16:
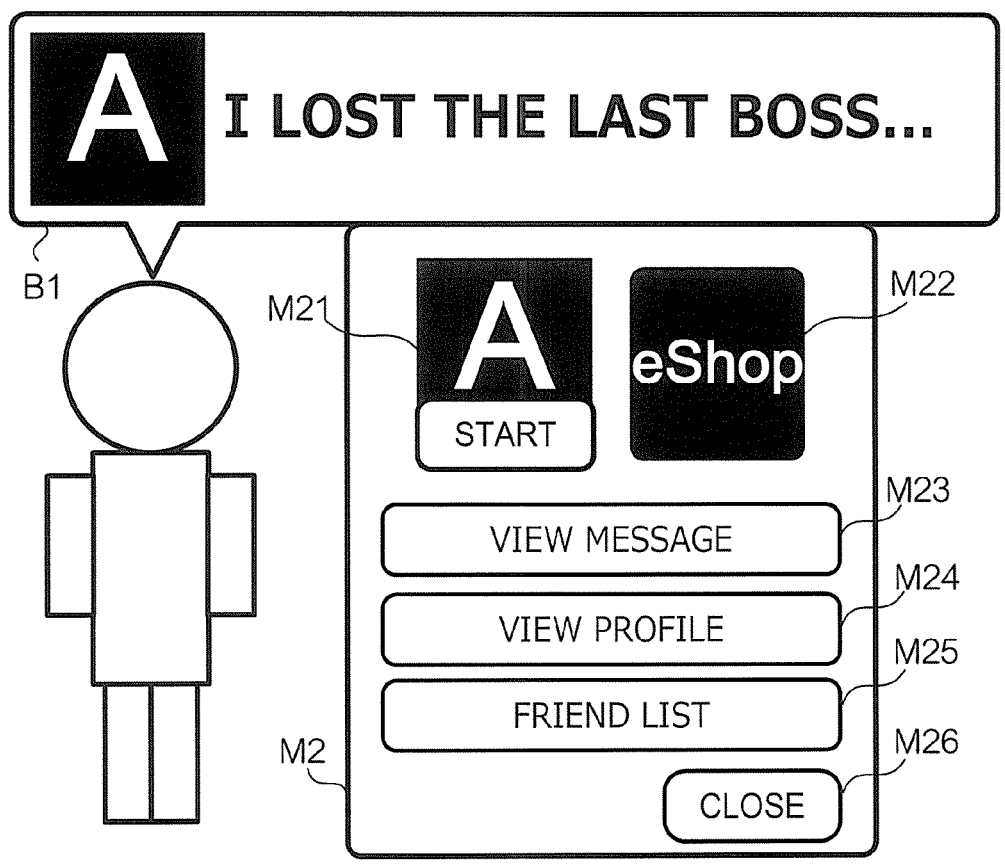
FIG. 16 shows an example non-limiting menu displayed in response to an input of an instruction for designating a user object.

FIG. 16 shows an example of a menu M2 displayed when an input instruction specifying a user object by main controller 300 or sub controller 400 user object is received. Upon receipt of a specification of a user object from a user, base station 200 displays a balloon object B1 associated with the user of the specified user object and the menu M2. In this example, a message posted to the message board by the user is displayed in balloon object B1.

Menu M2 includes a start icon M2, icon M22 linked to an online retail site, icon M23, icon M24, icon M25, and close icon M26. Start icon M21 and icon M22 have the functionally similar to start icon M11 and icon M12 of menu M1. Start icon M11 and icon M12 are icons of a game associated with user information of the user object. Icon M23 is selected to view a message board to which the message display in the balloon object B1. Icon M24 is selected to view a profile of a user of the user object. Icon M25 is selected to view friends of the user of the user object. Close icon M26 has the same functionality for closing icon M14 of menu M1.

Similarly to the process of displaying menu M1, processes performed by base station 200 subsequent to the display of menu M2 differ between a case in which a game of the displayed game object has already been purchased and a case in which the display game has not been purchased yet.

3. Modified Examples

The exemplary embodiments described above can be modified. Provided are modified examples of the above embodiments. It is noted that the modified examples provided below can be combined.

Modified Example 1

In the above exemplary embodiment, a user object is not necessarily an avatar and may be a character or image indicative of a user. For example, the user object may be a user icon, a user ID, a nickname or other text. In one embodiment, a group of users share a single user object and the remaining users share another user object.

A balloon object may be displayed without displaying a user object. Alternatively, a balloon object may be displayed in place of a user object; and in this case the balloon object need not necessarily be of a balloon shape. Any appearance for conveying a message can be adopted.

Modified Example 2

A type of content handled by the present technology is not limited to a game. The present technology can be applied to programs other than a game, such as music data, image data of an electronic book as a content, and so on.

Modified Example 3

The functionalities of the exemplary embodiment can be realized by hardware configurations other than information processing system 10, which system includes base station 200, gaming system 20, and information processing system 10. For example, an apparatus that performs the functionalities of base station 200 and main controller 300 may be employed in an information processing system. The functionalities of the above exemplary embodiment can be realized by use of a single apparatus or by use of multiple apparatuses co-operating with each other. For example, in the above exemplary embodiment, at least a part of the processing performed by base station 200 may be performed by server 100 or main controller 300. Additionally, two screens need not necessarily be provided for different devices, and there may be provided a single device. Moreover, more than three screens can be employed in the above-exemplified embodiment. The present technology can be employed in a method of controlling a display to conceal an image under a predetermined condition and a program including codes or instructions corresponding to the method, as well as a device and system. The program may be stored in a storage medium, such as an optical disk or semiconductor memory for provision to a user, or may be downloaded to a user's computer or, more generally, a user's information processing device.

The foregoing description of the embodiments is provided for the purposes of illustration and description. Obviously, a large number of possible modifications and variations will be apparent to practitioners skilled in the art. The embodiments were chosen and described in order to best explain the principles of the technology and its practical applications, thereby enabling others skilled in the art to understand the technology in various embodiments, and with the various modifications as suited to a particular use that may be contemplated.

What is claimed is:

1. An information processing device for playing video games, the device comprising:
   a computer processor, the information processing device being at least configured to perform:
      a selection that selects a predetermined number of video games including at least one of first video games available at an information processing device and at least one of second video games usable with restriction;
      a display control that displays objects each corresponding to a video game included in the selected at least one of first video games and the selected at least one of second video games; and
      an execution that executes a processing corresponding to an object included in the displayed objects in response to designation of the object by a user;
   wherein a history of activities includes activities of the plurality of users of the information processing device;
   wherein the processing device is further configured to perform an identification that identifies a current user from the plurality of users, wherein a part of the predetermined number of video games is selected based on activities of a user other than a current user;
   wherein the executed processing varies depending on whether the designated object corresponds to the selected at least one of first video games or the selected at least one of second video games; and
   wherein when the designated object corresponds to the selected at least one of first video games, the selected at least one of first video games is executed in a first process, and when the designated object corresponds to the selected at least one of second video games, a second process for activation of the selected at least one of second video games is initiated, wherein the first process and the second process are different.

2. The information processing device according to claim 1, wherein the part of the selected predetermined number of video games determined based on the play history of activities relating to a video game for the user is stored in the information processing device.

3. The information processing device according to claim 1, wherein the displayed objects corresponding to the selected video games are disposed on a single screen.

4. The information processing device according to claim 1, wherein the part of the selected predetermined number of video games determined based on the history of activities relating to a video game for the plurality of the other users is stored in the information processing device.

5. The information processing device according to claim 1, wherein the displayed objects corresponding to the selected video games are disposed on a single screen.

6. The information processing device according to claim 1, wherein the play history for the user is employed in determining the at least one of the first video games.

7. The information processing device according to claim 1, wherein the history of activities relating to a video game for a plurality of the other users is employed in determining the at least one of the second video games.

8. The information processing device according to claim 1, wherein the display control provides an indication of a popularity of the related video game based on the history of activities relating to that related video game for the plurality of other users.

9. The information processing device according to claim 2, wherein a part of the predetermined number of video games is selected from a plurality of the second video games based on the history of activities, which history is stored in at least one of the information processing device and another information processing device.

10. The information processing device according to claim 2, wherein the history of activities includes at least one of information on obtainment or usage of a video game and information on a post or evaluation for the video game.

11. The information processing device according to claim 4, wherein a part of the predetermined number of video games is selected from a plurality of the second video games based on the history of activities of the other users, which history is stored in at least one of the information processing device and another information processing device.

12. The information processing device according to claim 4, wherein the history of activities includes at least one of information on obtainment or usage of a video game and information on a post or evaluation for the video game.

13. A display method for playing video games, the method comprising:
selecting a predetermined number of video games including at least one of first video games available at an information processing device and at least one of second video games usable with restriction;
displaying objects each corresponding to a video game included in the selected at least one of first video games and the selected at least one of second video games; and
executing a processing corresponding to an object included in the displayed objects in response to designation of the object by a user;
wherein a history of activities includes activities of a plurality of users of the information processing device;
wherein the method further comprises identifying a current user from the plurality of users, wherein a part of the predetermined number of video games is selected based on activities of a user other than a current user;
wherein the executed processing varies depending on whether the designated object corresponds to the selected at least one of first video games or the selected at least one of second video games; and
wherein when the designated object corresponds to the selected at least one of first video games, the selected at least one of first video games is executed in a first process, and when the designated object corresponds to the selected at least one of second video games, a second process for activation of the selected at least one of second video games is initiated, wherein the first process and the second process are different.

14. A system for playing video games, the system comprising:
an information processing system comprising a computer processor, the information processing system being at least configured to provide:
a selector that selects a predetermined number of video games including at least one of first video games available at an information processing device and at least one of second video games usable with restriction;
a display controller that displays objects each corresponding to a video game included in the selected at least one of first video games and the selected at least one of second video games; and
an executor that executes a processing corresponding to an object included in the displayed objects in response to designation of the object by a user;
wherein a history of activities includes activities of a plurality of users of the information processing device;
wherein the information processing system is further configured to provide an identifier that identifies a current user from the plurality of users, wherein a part of the predetermined number of video games is selected based on activities of a user other than a current user;
wherein the executed processing varies depending on whether the designated object corresponds to the selected at least one of first video games or the selected at least one of second video games; and
wherein when the designated object corresponds to the selected at least one of first video games, the selected at least one of first video games is executed in a first process, and when the designated object corresponds to the selected at least one of second video games, a second process for activation of the selected at least one of second video games is initiated, wherein the first process and the second process are different.

15. A non-transitory readable medium storing a program that causes a computer for playing video games to execute:
selecting a predetermined number of video games including at least one of first video games available at an information processing device and at least one of second video games usable with restriction;
displaying objects each corresponding to a video game included in the selected at least one of first video games and the selected at least one of second video games; and
executing a processing corresponding to an object included in the displayed objects in response to designation of the object by a user;
wherein a history of activities includes activities of a plurality of users of the information processing device;
wherein the program further causes the computer to execute: identifying a current user from the plurality of users, wherein a part of the predetermined number of video games is selected based on activities of a user other than a current user;
wherein the executed processing varies depending on whether the designated object corresponds to the selected at least one of first video games or the selected at least one of second video games; and
wherein when the designated object corresponds to the selected at least one of first video games, the selected at least one of first video games is executed in a first process, and when the designated object corresponds to the selected at least one of second video games, a second process for activation of the selected at least one of second video games is initiated, wherein the first process and the second process are different.

* * * * *